United States Patent [19]

Love

[11] Patent Number: 4,759,148
[45] Date of Patent: Jul. 26, 1988

[54] FISHING ACCESSORY CONTAINER

[76] Inventor: Francis L. Love, 3128 Meyer Dr., Sarasota, Fla. 33579

[21] Appl. No.: 55,321

[22] Filed: May 29, 1987

[51] Int. Cl.$^4$ ............................................. A01K 97/04
[52] U.S. Cl. .......................................... 43/54.1; 43/56; 220/409; 220/410
[58] Field of Search ................... 43/54.1, 56; 206/315.11; 220/408, 409, 410, 23.83, 23.86

[56] References Cited

U.S. PATENT DOCUMENTS

| | | | |
|---|---|---|---|
| 1,587,785 | 6/1926 | Marsh et al. | 43/56 |
| 1,606,811 | 11/1926 | Schilke | 43/56 X |
| 2,093,132 | 9/1937 | Logan | 43/56 |
| 2,179,095 | 11/1939 | Kelsey | 43/56 |
| 2,250,729 | 7/1941 | Smith et al. | 220/252 |
| 2,597,601 | 5/1952 | Sherman | 43/57.1 |
| 3,499,244 | 3/1970 | Malone | 43/56 |
| 3,751,845 | 8/1973 | Van Leeuwen | 43/56 |
| 4,611,726 | 9/1986 | Skinnell | 43/56 X |

Primary Examiner—Nicholas P. Godici
Assistant Examiner—Carmine Cuda
Attorney, Agent, or Firm—Charles J. Prescott; Raymond H. Quist

[57] ABSTRACT

A commonly available five gallon pail is used as the base structure for a fishing accessory container. A compartmented insert is sized to fit in the pail and is supported by a rim which overlies the rim of the pail. A lid, which may be a domed lid hinged to the insert, provides a cover for the insert. This arrangement provides space in the pail below the insert, compartments within the insert, and space above the insert, all of which may be used to convey various accouterments for a fishing expedition.

18 Claims, 3 Drawing Sheets

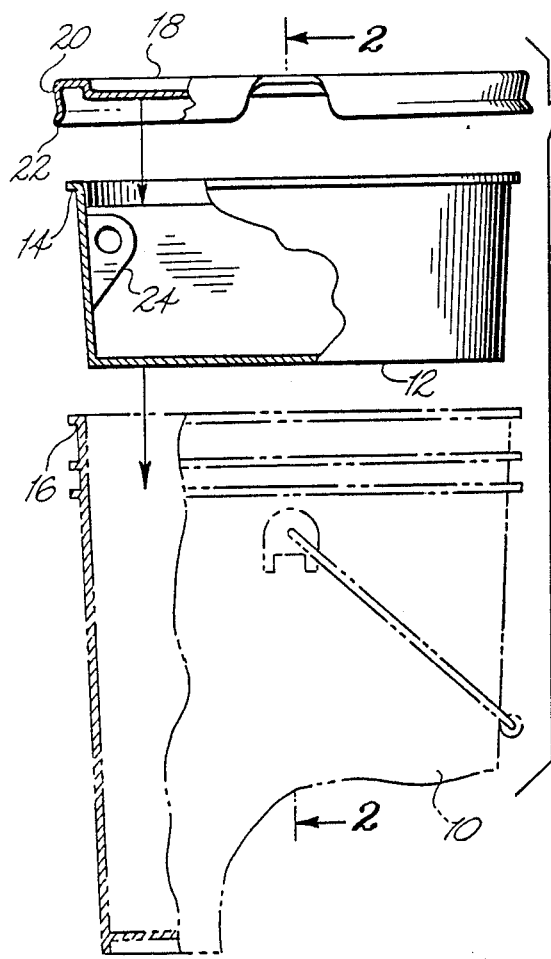
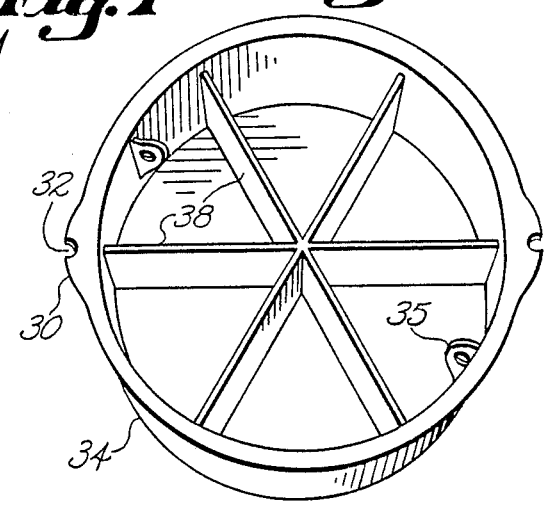
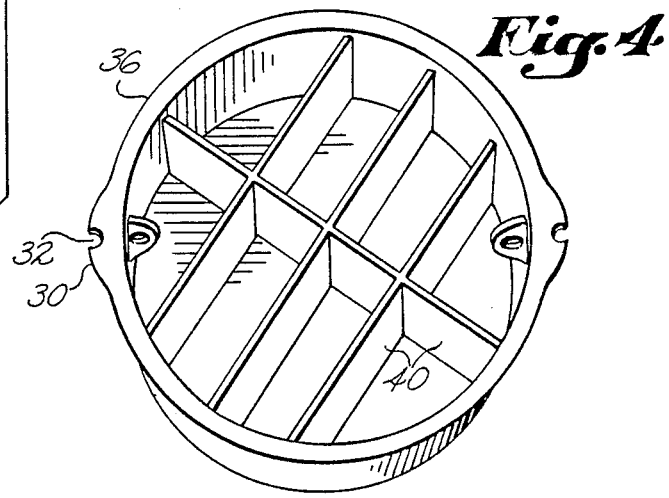
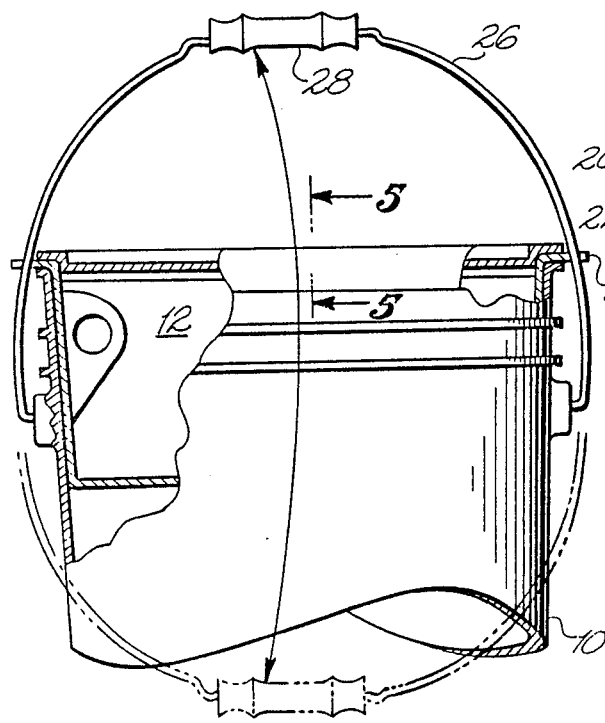
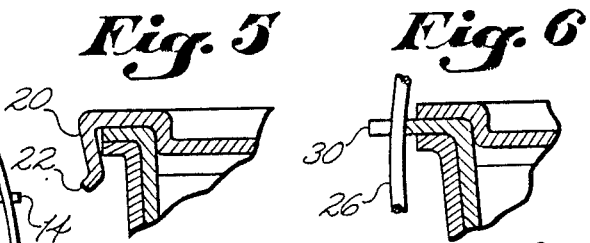
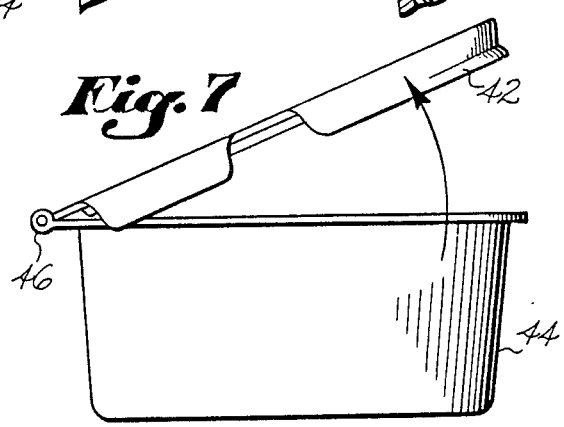

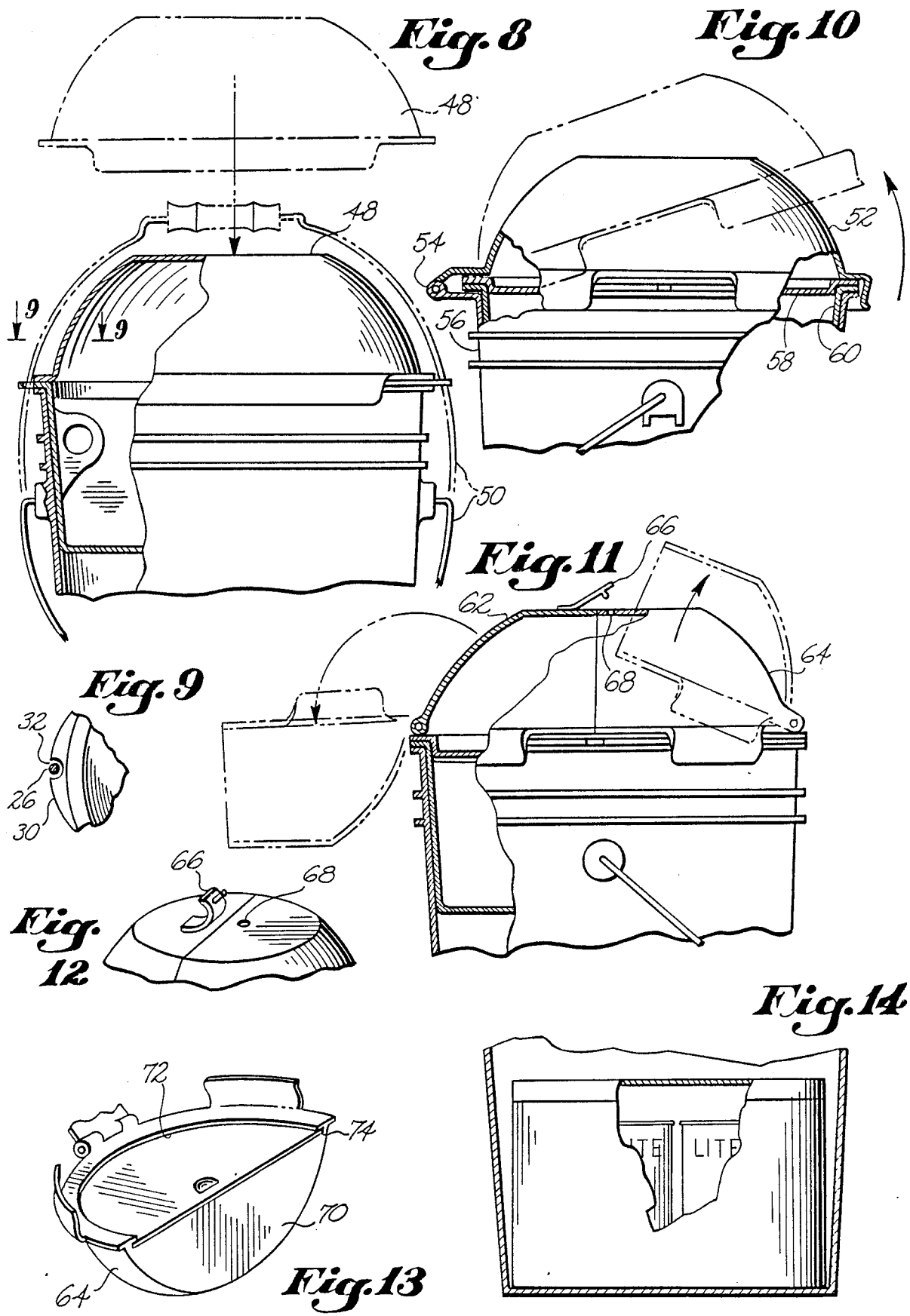

FISHING ACCESSORY CONTAINER

BACKGROUND OF THE INVENTION

1. Field of the Invention

This invention relates generally to a multipurpose fishing accessory container, and more particularly to an insert which may be removeably mounted in a pail, and the insert in combination with such a pail.

2. Description of Related Art

Although tradition tells us that one can go fishing with nothing more than a stick with a string and a pin on the end in one hand, and a can of worms in the other; most sports fisherman find it desirable to have at hand a more elaborate stock of equipment and accessories. Even when nets and creels are hung from the belt or slung from the shoulders, there still remain the rod, tackle, bait, refreshments, etc.

The present invention is a fishing accessory container which is sturdy—yet simple in structure. A pail, such as the ubiquitous five gallon container, is utilized as the basic support structure. A compartmented insert, supported by the rim of the pail, provides a plurality of small compartments for lures, sinkers and the like. This insert extends only partially down into the pail, leaving a capacious bottom portion in which bait, refreshments, or other apparatus may be contained. Other structure provides additional capabilities.

It is therefore an object of this invention to provide a fishing accessory container in the form of a removable insert for a pail.

It is also an object of this invention to provide a fishing accessory container consisting of an insert in combination with a pail.

It is a further object of this invention to provide a fishing accessory container having a pail as a supporting structure, a removable upper insert, a removable lower insert, and a superior compartment.

In accordance with these and other objects, which will become apparent hereafter, the instant invention will now be described with reference to the accompanying drawings.

BRIEF DESCRIPTION OF THE DRAWINGS

FIG. 1 is an exploded view of a fishing accessory container in accordance with the invention showing a pail in phantom view and the upper insert and lid;

FIG. 2 is an elevation of the pail with the upper insert in place;

FIG. 3 is an upper perspective of one form of upper insert;

FIG. 4 is an upper perspective of another form of upper insert;

FIG. 5 is a detail showing the configuration of the pail rim, the insert rim and the lid;

FIG. 6 is a detail showing a portion of the insert rim forming a detent for the bail;

FIG. 7 shows an insert having a hinged lid;

FIG. 8 shows an insert in the pail with an alternate domed lid;

FIG. 9 is a plan view detail of the detent arrangement

FIG. 10 shows a hinged dome lid;

FIG. 11 shows a domed lid having two hinged halves;

FIG. 12 is a detail in perspective showing a securing arrangement for the two halves of FIG. 11;

FIG. 13 is a perspective view of one of the half domed lids;

FIG. 14 shows an additional insert in the bottom of the pail;

SUMMARY OF THE INVENTION

Figure 15:
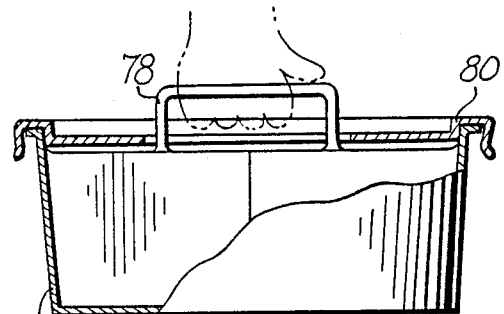
FIG. 15 shows an insert having a separate handle.

A fishing accessory container is formed by providing a multicompartmented insert which will be supported in a pail, such as a readily available five gallon pail. The insert extends only part way down into the pail leaving a volume below to be used as is, or with an additional insert. A flat lid of the type normally found on such a pail may be used, or the insert may be provided with a hinged lid. The hinged lid may be flat or domed. The domed lid may be in two halves.

DETAILED DESCRIPTION OF THE INVENTION

Referring to FIG. 1, pail 10 is a commonly available five gallon pail of the type used as an expendable container for paint, potato salad and many other substances. Such pails are typically not refilled and thus may enable one to obtain at little or no cost the basic support structure for the invention. It should be recognized, however, that it may be found desirable to market the pail as part of the fishing accessory container of this invention. In such a case, the particular capacity of the pail may be chosen as desired. A pail suitable for use may be formed of metal or plastic.

Upper insert 12, as shown in FIG. 1, is cylindrical and sized to fit within pail 10, with rim 14 of insert 12 sized to overlie rim 16 of pail 10. Rim 16 thereby supports insert 12. Lid 18 is of the type usually used with pail 10, having a downwardly extending edge 20 with a lip 22 extending outwardly somewhat to facilitate removal. The detail of FIG. 5 shows this structure more clearly. Insert 12 is also provided with inwardly extending boss 24 having a finger hole therein to facilitate removal of insert 12 from pail 10.

As shown in FIG. 2, pail 10 is equipped with bail 26 having handle 28. Bail 26 is moveable between the carrying position with the handle upright and the position shown in broken lines where it is moved so as not to obstruct access to the top of the container. As most clearly seen in FIG. 9, on opposite sides of the rim 14 of insert 12 are provided detent extensions 30 having detent recesses 32 to releaseably hold bail 26 in the upright carrying position. This detent provides better control over the movement of pail 10 while it is being carried by handle 28.

Referring to FIGS. 3 and 4, inserts 34 and 36 respectively, contain vertically extending walls 38 and 40 which divide the inserts into compartments so that fishing tackle components may be stored in an orderly manner. Also, as shown in FIG. 3, handles 35 having finger holes are provided in the inserts.

Although the type of lid normally available with pail 10 will serve for the fishing accessory container of this invention as was described above, FIG. 7 shows an alternate embodiment wherein lid 42 is made captive to insert 44 by hinge 46.

FIG. 8 discloses an additional storage arrangement for the fishing accessory container. Domed lid 48 may be substituted for the generally flat lid previously described. As indicated in this FIG., lid 48 can be removed vertically when bail 50 is lowered. The interior volume provided by domed lid 48 is thereby added to the container.

In lieu of lifting the domed lid off the insert, FIG. 10 demonstrates domed lid 52 with hinge 54 connecting it to pail 56. A supplementary lid 58 is also provided for insert 60. With this arrangement, lid 58 provides a support tray for items carried under domed lid 52. Lid 58 can also be used separately with insert 60 if it is desired to remove insert 60 from pail 56.

Turning to FIGS. 11–13, still an additional embodiment is illustrated. A domed lid is here provided having two halves 62 and 64. These halves can be latched in place using tab 66 which cooperates with hole 68. Both halves are separately hinged to the insert. As shown in FIG. 13, each half, such as half 64 has a side wall 70, and a closure 72 which slides into slot 74 so that objects can be secured within the half without falling out when the dome-halves are closed.

As previously indicated, the space in the pail below the insert may be used for any desired storage. FIG. 14 shows an additional insert which in this case is styrofoam or other heat insulating material which can be used to store material at other than ambient temperature. Thus already cold beverage cans may be placed therein.

Figure 16:
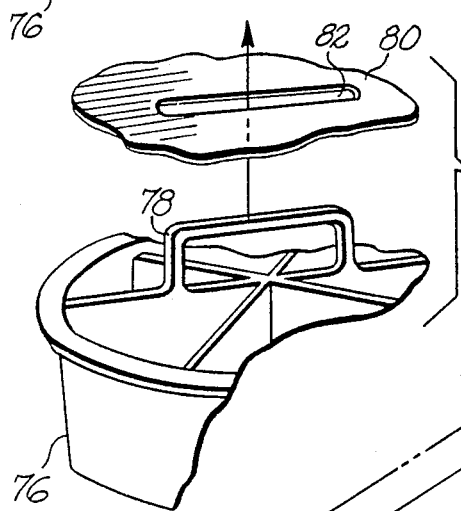
FIG. 16 shows the insert of FIG. 15 with a detail of the cooperating lid.

Referring to FIGS. 15 and 16, insert 76 is shown as having handle 78 which provides a convenient means for carrying the insert. Lid 80 in this embodiment, includes slot 82 which permits the handle to extend through the lid.

Figure 17:
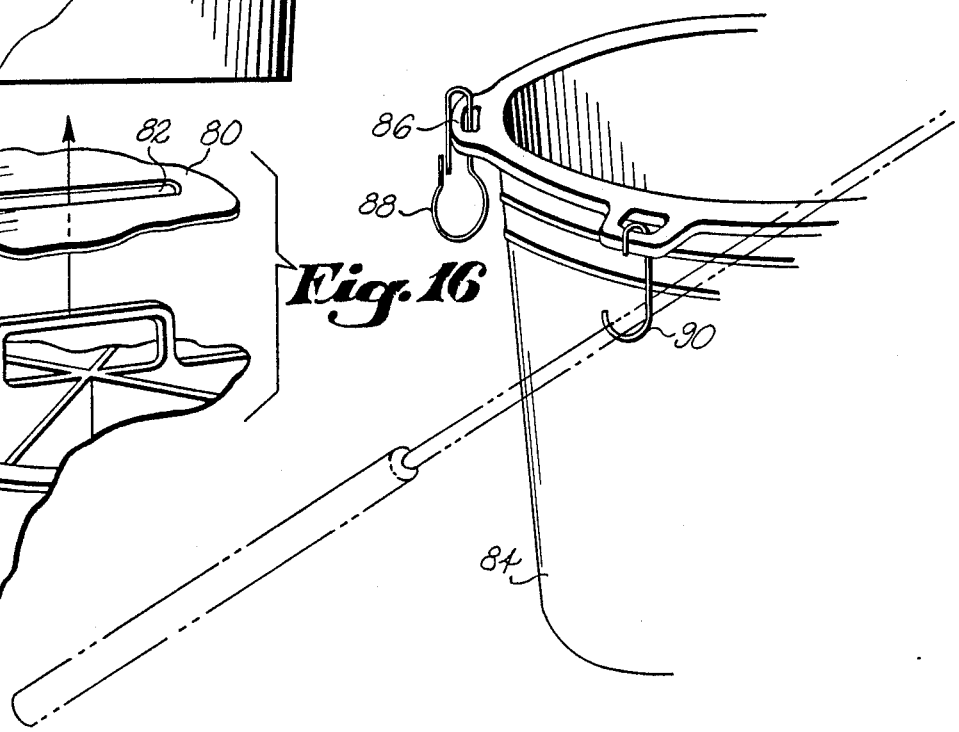
FIG. 17 shows a modified pail to support additional holding devices.

FIG. 17 shows pail 84 which includes a plurality of support eyes 86 to which hooks such as hooks 88 and 90 are secured. Hook 90 is shown to have a U-shaped configuration so as to facilitate resting a pole in it.

Figure 18:
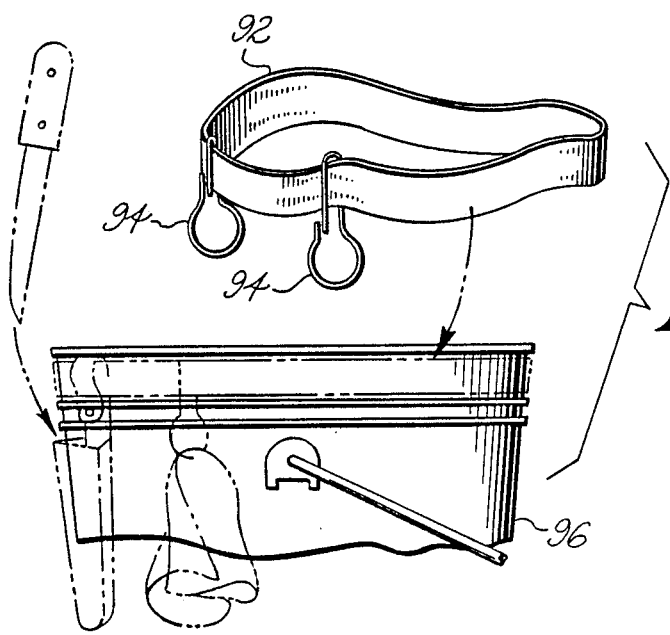
FIG. 18 shows a belt arrangement for supporting additional holding devices used with a standard pail.

FIG. 18 illustrates an alternative way of providing support for a plurality of hooks. Elastic belt 92 having hooks 94 thereon is sized to fit snugly about pail 96 in the groove of the pail near its top.

The fishing accessory container of this invention consequently provides a large volume of compartmented space which can be readily carried in one hand. The container may be utilized in a very simple form with a single compartmented insert, or provided with a superior compartment above the insert in a somewhat more sophisticated structure.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A fishing accessory container having as a support structure a pail having a horizontal rim at the top comprising:
   a cylindrical insert sized to fit within said pail;
   said insert having a horizontal rim at the top sized to overlie said pail rim;
   said insert having vertically extending walls therein dividing said insert into compartments;
   a lid having a diametrically extending slot therethrough for closing the top of said insert;
   said insert having a carrying handle connected to said vertically extending walls and positioned to pass through said slot and protrude therefrom.

2. A fishing accessory container in accordance with claim 1 further including:
   an outer domed lid for the pail.

3. A fishing accessory container in accordance with claim 1 further including:
   a hollow domed lid for additional storage space.

4. A fishing accessory container in accordance with claim 3 wherein:
   said domed lid is hinged to said insert.

5. A fishing accessory container in accordance with claim 3 wherein:
   said domed lid is in two parts and each part is separately hinged to said insert.

6. A fishing accessory container in accordance with claim 3 wherein:
   said domed lid is in two parts and each part is separately hinged.

7. A fishing accessory container comprising:
   a cylindrical pail having a bail;
   said pail having a horizontal rim at the top;
   a cylindrical insert compartmented by vertical walls having a rim at the top;
   said insert sized to fit within said pail and said insert rim sized to overlie said pail rim;
   a lid having a diametrically extending slot therethrough for closing the top of said insert;
   said insert having a carrying handle connected to said vertical walls and positioned to pass through said slot and protrude therefrom.

8. A fishing accessory container in accordance with claim 7 further including:
   heat insulating insert means having outer dimensions sized to fit on the bottom of said pail and extending to below said compartmental insert for containing materials at other than ambient temperature.

9. A fishing accessory container in accordance with claim 7 wherein:
   said pail includes a plurality of hook support eyes.

10. A fishing accessory container in accordance with claim 7 further including:
    an elastic hook support belt sized to fit snugly around said pail.

11. A fishing accessory container in accordance with claim 7 further including lid means for closing the top of said pail with said insert therein.

12. A fishing accessory container in accordance with claim 11 wherein:
    said lid means is a domed lid.

13. A fishing accessory container in accordance with claim 12 wherein:
    said domed lid is hinged to said pail.

14. A fishing accessory container in accordance with claim 12 wherein:
    said domed lid is hinged to said insert.

15. A fishing accessory container in accordance with claim 12 wherein:
    said domed lid is in two parts and each part is separately hinged.

16. A fishing accessory container in accordance with claim 15 wherein:
    said domed lid parts are hinged to said pail.

17. A fishing accessory container in accordance with claim 15 wherein:
    said domed lid parts are hinged to said insert.

18. A fishing accessory container in accordance with claim 17 wherein:
    said domed lid parts have closures.

* * * * *